(12) United States Patent
Kim et al.

(10) Patent No.: US 7,078,124 B2
(45) Date of Patent: Jul. 18, 2006

(54) POSITIVE ELECTRODE HAVING POLYMER FILM AND LITHIUM-SULFUR BATTERY EMPLOYING THE POSITIVE ELECTRODE

(75) Inventors: Ju-Yup Kim, Seoul (KR); Myung-Dong Cho, Hwaseong-si (KR); Young-Gyoon Ryu, Gyeonggi-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/924,912

(22) Filed: Aug. 25, 2004

(65) Prior Publication Data

US 2005/0175903 A1   Aug. 11, 2005

(30) Foreign Application Priority Data

Aug. 29, 2003   (KR) ............... 10-2003-0060197

(51) Int. Cl.
*H01M 2/18* (2006.01)
(52) U.S. Cl. ............... 429/137; 429/314; 429/205
(58) Field of Classification Search ............... 429/205, 429/314
See application file for complete search history.

(56) References Cited

U.S. PATENT DOCUMENTS

| | | | |
|---|---|---|---|
| 5,523,179 A | 6/1996 | Chu | |
| 5,814,420 A | 9/1998 | Chu | |
| 5,961,672 A | 10/1999 | Skotheim et al. | |
| 6,017,651 A | 1/2000 | Nimon et al. | |
| 6,025,094 A | 2/2000 | Visco et al. | |
| 6,030,720 A | 2/2000 | Chu et al. | |
| 2004/0029014 A1* | 2/2004 | Hwang et al. | ............... 429/246 |

FOREIGN PATENT DOCUMENTS

| | | |
|---|---|---|
| JP | 2002-203542 | 7/2002 |
| WO | WO99/38225 | 7/1999 |

* cited by examiner

*Primary Examiner*—Patrick Joseph Ryan
*Assistant Examiner*—Ben Lewis
(74) *Attorney, Agent, or Firm*—Robert E. Bushnell, Esq.

(57) ABSTRACT

A positive electrode which has a positive active material layer formed on a conductive substrate and a polymer film coated on the positive active material layer, wherein the positive active material layer includes a positive active material, pores of which are filled with a polymeric material containing a nonaqueous electrolyte, and the polymer film, and the polymer film formed of the polymeric material containing the nonaqueous electrolyte. The polymeric material is formed by polymerization of a composition comprising a monomer and the nonaqueous electrolyte. The monomer includes 1 to 6 functional groups per molecule, and the functional groups are selected from the group consisting of vinyl, allyl, acryl, methacryl and epoxy group. Since the lithium-sulfur battery using the positive electrode increases degree of the positive active material utilization, the cycle life characteristics and capacity of the battery can be improved, and swelling of the positive electrode of the lithium-sulfur battery can be reduced.

18 Claims, 4 Drawing Sheets

POSITIVE ELECTRODE HAVING POLYMER FILM AND LITHIUM-SULFUR BATTERY EMPLOYING THE POSITIVE ELECTRODE

CLAIM OF PRIORITY

This application claims all benefits accruing under 35 U.S.C. §119 from the Korean Patent Application No. 2003-60197, filed Aug. 29, 2003, in the Korean Intellectual Property Office, the disclosure of which is incorporated herein in its entirety by reference.

BACKGROUND OF THE INVENTION

1. Field of the Invention

The present invention relates to a positive electrode having a polymer film and a lithium-sulfur battery employing the positive electrode, and more particularly, to a positive electrode having an ionically conductive polymer film coated thereon and a lithium-sulfur battery employing the positive electrode, which has improved cycle life and battery capacity characteristics and a reduced swelling phenomenon.

2. Description of the Related Art

The rapid development of portable electronic devices has led to an increasing demand for secondary batteries having a lighter weight, a smaller size and a higher energy density. To satisfy these demands, a need exists for development of cheaper, safer and more environmentally friendly batteries.

Among the currently developing batteries satisfying such requirements, a lithium-sulfur battery is one of the most promising batteries in view of energy density and environmental friendliness. With respect to specific energy density, the lithium-sulfur battery is the most desirable since sulfur has an energy density of 1,675 mAh/g, which is about 8 times higher than that of lithium cobalt oxide ($LiCoO_2$) or lithium manganese oxide, which have been conventionally widely used as a positive active material of a lithium battery. Further, the sulfur-based compounds are less costly than other materials and are environmentally friendly. However, no lithium-sulfur batteries have yet been commercialized.

One of the reasons these batteries have not been commercialized is the poor sulfur utilization over repeated cycling, resulting in a low capacity. The sulfur utilization is referred to as a ratio of the amount of the sulfur involved in the electrochemical redox reaction of batteries to the amount of total sulfur used.

Further, sulfur is diffused away to electrolytes upon the redox reaction, deteriorating the cycle life characteristics. Accordingly, unless the electrolyte is suitable, the reduced product of sulfur, lithium sulfide ($Li_2S$), is precipitated, and as a result does not participate in further electrochemical reactions. That is, lithium-sulfur batteries use elemental sulfur as a positive active material at an initial stage. As the battery is continuously discharged, 8 sulfur elements present in a ring-shaped molecular state are reduced to become linear molecules until they finally become sulfur anions ($S^{2-}$), which is strongly bonded to neighboring lithium cations, forming lithium sulfide ($Li_2S$). The formed lithium sulfide ($Li_2S$) is precipitated on a surface of a positive electrode, which reduces an active area of a battery. Also, since the precipitated lithium sulfide ($Li_2S$) cannot be oxidized during charging, the capacity of the battery is lowered. Therefore, it is necessary to dissociate lithium sulfide to maintain an active area of the battery.

In order to increase degree of sulfur utilization and solubility of lithium sulfide ($Li_2S$), a variety of research into lithium salts and nonaqueous solvents has been conducted, including the followings.

U.S. Pat. No. 6,030,720 discloses a lithium-sulfur battery using a mixed electrolyte solvent including, as a main solvent, an ethoxy repeating unit compound of the general formula $R_1(CH_2 CH_2O)_n R_2$, where n ranges from 2 to 10, $R_1$ and $R_2$ are different or identical alkyl or alkoxy groups (including substituted alkyl or alkoxy groups) and a cosolvent having a donor number of at least about 15. $R_1$ and $R_2$ may together with $(CH_2 CH_2O)_n$ form a closed ring. Also, the disclosed battery has a separation distance of not greater than about 400 micrometers.

In order to achieve a battery having improved cycle life and safety, U.S. Pat. No. 5,961,672 discloses an electrochemical battery cell comprising a stabilized lithium anode using a thin film of a lithium ion conducting polymer.

U.S. Pat. No. 5,523,179 discloses a lithium-sulfur battery having a positive electrode including about 20 to 80 wt % of active-sulfur, about 15 to 75 wt % of an ionically conductive material and about 5 to 40 wt % of electronically conductive material.

U.S. Pat. No. 5,814,420 discloses a lithium-sulfur battery comprising a positive electrode including an electrochemically active material containing sulfur present in forms of elemental sulfur, lithium sulfide and lithium polysulfide, and an electronically conductive material.

Many attempts have been made to overcome several drawbacks of the conventional lithium-sulfur batteries. Nevertheless, the key problem with the conventional lithium-sulfur battery, that is, low degree of sulfur utilization, is still open for resolution.

Another problem with the conventional lithium-sulfur battery is deterioration in cycle life and capacity characteristics due to use of lithium metal as a negative electrode. That is, with repeated charge and discharge cycles, dendrites grow on a surface of lithium metal to contact the positive electrode, which leads to short circuit of the battery, impairing battery performance. Deterioration in battery capacity results from erosion of lithium metal due to a reaction between the lithium surface and an electrolytic solution.

To resolve these problems, a method of forming a protective film on a surface of a lithium electrode has been proposed, as disclosed in U.S. Pat. Nos. 6,017,651, 6,025, 094 and 5,961,672.

In order to ensure proper operation of the lithium protective film, it is necessary to prevent lithium and electrolyte from contacting each other while allowing lithium ions to migrate freely. The prior art, however has several problems.

That is, most of lithium electrode protective films, which are formed after assembling the battery, followed by reacting lithium with additives in an electrolytic solution, have poor density, so that a considerable amount of the electrolytic solution permeates through pores in the protective film, undesirably resulting in contact with lithium metal.

Alternative way of forming a lithium protective film involves processing the surface of a lithium electrode with nitrogen plasma to form lithium nitride ($Li_3N$) film on the lithium electrode. However, this attempt still has several drawbacks in that the lithium nitride film has grain boundaries through which the electrolytic solution easily permeates, and has so poor resistance to water that it is liable to decompose when in contact with water. Also, since the lithium nitride film has a low potential window, i.e., 0.45 V, it is impractical to use the lithium nitride film.

SUMMARY OF THE INVENTION

It is therefore an object of the present invention to provide an improved positive electrode.

It is another object of the present invention to provide an improved lithium-sulfur battery.

It is also an object of the present invention to provide a positive electrode which can improve degree of a positive active material utilization, reduce occurrence of swelling and suppress leakage of sulfur and lithium sulfide and the like which are discharge products of sulfur.

It is further an object of the present invention to provide a lithium-sulfur battery having improved life cycle and capacity characteristics and a stabilized negative electrode of lithium metal by employing the positive electrode.

In order to achieve the above and other objectives, a preferred embodiment of the present invention may be constructed with a positive electrode which includes a positive active material layer comprising at least one positive active material selected from the group consisting of elemental sulfur, metal sulfide and metal polysulfide, wherein pores of the positive active material layer are filled with a polymeric material containing a nonaqueous electrolyte, and a polymer film coated on the positive active material layer, the polymer film formed of the polymeric material.

According to another aspect of the present invention, a lithium-sulfur battery may be constructed with a nonaqueous electrolyte; a negative electrode comprising at least one negative active material selected from the group consisting of lithium, sodium, lithium alloy, sodium alloy, and a composite of lithium/inactive sulfur compound; a positive electrode comprising: a positive active material layer comprising at least one positive active material selected from the group consisting of elemental sulfur, metal sulfide and metal polysulfide, wherein pores of the positive active material layer are filled with a polymeric material containing a nonaqueous electrolyte; and a polymer film coated on the positive active material layer, the polymer film formed of the polymeric material; and a separator disposed between the negative electrode and the positive electrode for separating them from each other.

The sulfur-lithium battery employing the thus-constructed positive electrode has improved electrolyte-impregnating ability of the positive electrode. Also, a positive active material such as sulfur, lithium sulfide, or lithium polysulfide is suppressed from leaking into the electrolyte, so that the positive active material can further participate in the electrochemical reaction. Further, since the positive active material is prevented from reacting with lithium or lithium alloy, the negative electrode formed of lithium metal or lithium alloy can be stabilized.

Therefore, since the lithium-sulfur battery employing the positive electrode according to the present invention has increased degree of the positive active material utilization and swelling of the positive electrode can be reduced, cycle characteristics and capacity of the battery can be improved.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
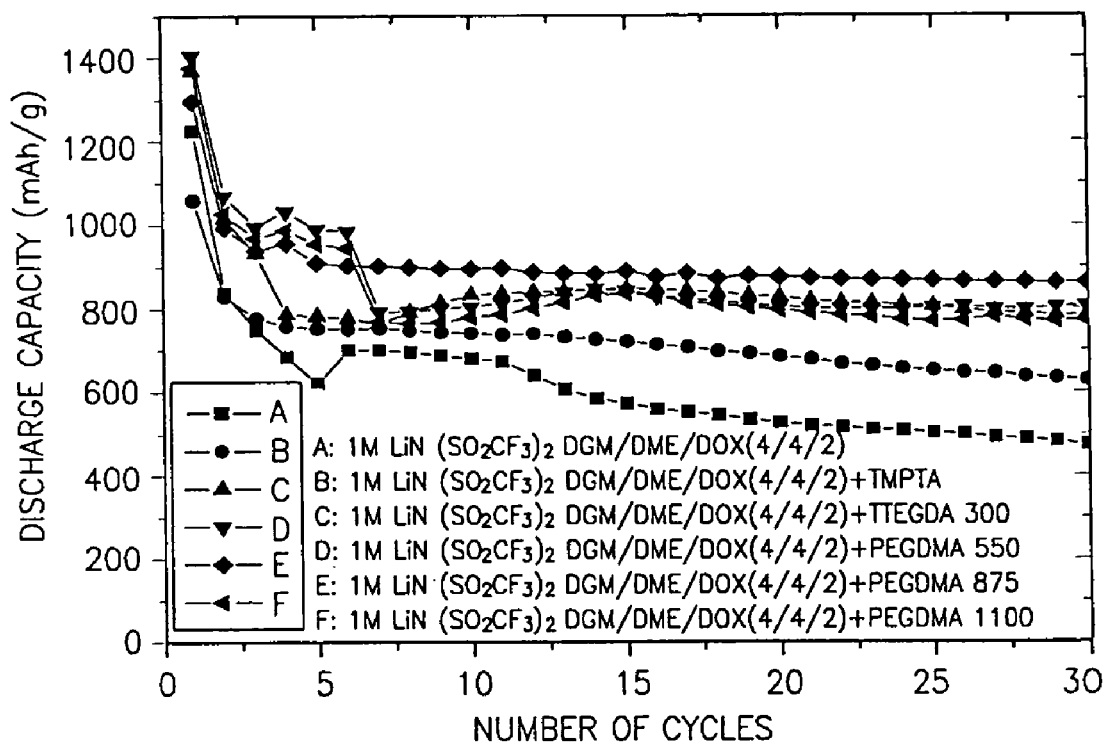
FIG. 1 is a graphical representation illustrating cycle characteristics of test cells according to Examples 1 through 5 of the present invention and Comparative Example 1.

A positive electrode according to the present invention and a lithium-sulfur battery employing the same will now be described in detail.

The positive electrode according to the present invention comprises a positive active material layer formed on a conductive substrate. The positive active material layer includes a positive active material comprising at least one type of sulfur selected from the group consisting of elemental sulfur, metal sulfide and metal polysulfide. A surface of the positive active material layer is coated with a polymer film containing a nonaqueous electrolyte, and pores formed in the positive active material layer are filled with a polymeric material containing the nonaqueous electrolyte.

In the case of using lithium metal as a negative electrode, the metal sulfide and the metal polysulfide are lithium sulfide and lithium polysulfide which are discharge products of elemental sulfur.

The positive electrode according to the present invention exhibits improved electrolyte-impregnating ability. Also, a positive active material such as sulfur, lithium sulfide, or lithium polysulfide is suppressed from leaking into the electrolyte, so that the positive active material can further participate in the electrochemical reaction. Further, since the positive active material is prevented from reacting with lithium or lithium alloy, the negative electrode formed of lithium metal or lithium alloy can be stabilized.

The polymer film and the polymeric material are preferably formed by polymerization of a composition comprising a monomer including 1 to 6 functional groups per molecule, and the functional groups are selected from the group consisting of vinyl, allyl, acryl($CH_2=CH-COO-$), methacryl($CH_2=C(CH_3)-COO-$), and epoxy group such as glycidyl group, and the nonaqueous electrolyte. More preferably, the number of the functional groups per molecule of the monomer is 2 to 6.

Specific examples of the monomer include, but are not limited to, acrylamide, divinylbenzene, butyl acrylate, hexyl acrylate, trimethylolpropane triacrylate (TMPTA), butanediol diacrylate, butanediol dimethacrylate, diallyl succinate, diallyl maleate, diallylsuberate, ethylene glycol diacrylate, ethylene glycol dimethacrylate, ethyleneglycol divinyl ether, tetra(ethylene glycol) diacrylate (TTEGDA), poly(ethylene glycol) diacrylate (PEGDA), poly(ethylene glycol) dimethacrylate (PEGDMA), and poly(ethylene glycol) divinyl ether.

The composition for forming the polymer film and the polymeric material preferably comprises 10 to 50 wt % of the monomer and 50 to 90 wt % of the nonaqueous electrolyte. More preferably, the monomer is contained in an amount of 10 to 30 wt %. If the amount of the monomer is less than 10 wt %, the degree of crosslinking is so low that electrolyte-impregnating capability and mechanical property of the polymer film and the polymeric material become poor. If the amount of the monomer is greater than 50 wt %, internal resistance of a positive electrode increases and the capacity of a battery may be reduced during high-rate charge and discharge cycles. The monomer preferably has a weight-average molecular weight of 200 to 2,000, more preferably 400 to 1,000. If the weight-average molecular weight of the monomer is less than 200, a crosslinking density in a molecular structure of a polymer is too high for a lithium salt or a positive active material to move freely. If the weight-average molecular weight of the monomer is greater than 2,000, a crosslinking density in a molecular structure of a polymer is so low that the electrolyte-impregnating capability of the polymer may be reduced.

Preferably, the nonaqueous electrolyte comprises a nonaqueous solvent and 0.8 to 2.5 mol/C of a lithium salt.

The nonaqueous solvent may be any solvent as long as it can be used in the conventional lithium-sulfur battery. Specific examples of the nonaqueous solvent include, but are not limited to, benzene, fluorobenzene, toluene, trifluorotoluene, xylene, cyclohexane, tetrahydrofurane (THF), 2-methyltetrahydrofurane, ethanol, isopropyl alcohol, dimethylcarbonate, ethyl methyl carbonate, diethyl carbonate, methyl propyl carbonate, methyl propionate, ethyl propionate, methyl acetate, ethyl acetate, propyl acetate, 1,3-dioxolane, glyme, diglyme, tetraglyme, ethylene carbonate, propylene carbonate, gamma butyrolactone(GBL), sulfolane, dimethylsulfone, butyrolactone, N-methylpyrrolidone, tetramethylurea, $C_2$ to $C_{12}$ aliphatic ether, at least one crown ether selected from the group consisting of 12-crown-4, 15-crown-5, 18-crown-6 and dibenzo-18-crown-6, dimethoxyethane, hexamethylphosphoamide, pyridine, N,N-dimethylformamide, N,N-diethylformamide, N,N-dimethylacetamide, N,N-diethylacetamide, dimethylsulfoxide, tetramethylurea, trimethyl phosphate, tributyl phosphate, tetramethylethylene diamine, tetramethylpropylenediamine, or pentamethyldiethylenetriamine.

Specific examples of the lithium salt include, but are not limited to, $LiPF_6$, $LiBF_4$, $LiClO_4$, $LiCF_3SO_3$, $LiC_4F_9SO_3$, $LiN(CF_3SO_2)_2$, and $LiAsF_6$.

The positive active material layer preferably further includes at least one conductive agent selected from the group consisting of carbon black, graphite, carbon fiber, a conductive compound having a conjugated carbon-carbon double bond, and a conductive compound having a conjugated carbon-nitrogen double bond. Specific examples of the conductive compound include, but are not limited to, polyaniline, polythiopene, polyacetylene, and polypyrrole.

The positive active material layer is attached to a conductive substrate by a binder. It is preferable that the binder is not swollen by a liquid electrolyte and allows sulfur to be partially soaked by the liquid electrolyte. Specific examples of the binder include, but are not limited to, polyvinyl acetate, polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of hexafluoropropylene and vinylidene fluoride, polyethyl acrylate, polytetrafluoroethylene, polyvinyl chloride, polyacrylonitrile, polyvinyl pyridine, polystyrene, derivatives thereof, blends of any of the above-listed polymers, and copolymers of any monomers used to prepare the above-listed polymers. The amounts of positive active material such as elemental sulfur, the conductive agent and the binder contained in the positive active material layer are not specifically limited as long as they are within commonly employed ranges in the field of lithium batteries.

The polymer film is preferably coated to a thickness of 0.5 to 10 μm. If the coated thickness is less than 0.5 μm, the electrolyte-impregnating capability is substantially reduced. If the coated thickness is greater than 10 μm, interfacial resistance between an electrode and electrolyte may overly increase. The positive electrode according to the present invention is intended for a lithium-sulfur battery, preferably a rechargeable lithium-sulfur secondary battery, and it can also be used for other type batteries using a negative electrode of lithium metal or lithium alloy.

A lithium-sulfur battery employing the positive electrode according to the present invention will now be described in detail.

The lithium-sulfur battery according to the present invention comprises:

(a) a nonaqueous electrolyte;

(b) a negative electrode including at least one negative active material selected from the group consisting of lithium, sodium, lithium alloy, sodium alloy, and a composite of lithium/inactive sulfur compound;

(c) a positive electrode including a positive active material layer formed on a conductive substrate, the positive active material layer including a positive active material containing at least one type of sulfur selected from the group consisting of elemental sulfur, metal sulfide and metal polysulfide, a surface of the positive active material layer being coated with a polymer film including the nonaqueous electrolyte, the positive active material layer having pores filled with a polymeric material including the nonaqueous electrolyte; and (d) a separator disposed between the negative electrode and the positive electrode for separating them from each other.

The lithium-sulfur battery can be manufactured by any assembling technique known in the art or in any known shape of battery using the positive electrode. The shape of a battery varies according to applications of the battery, and detailed examples thereof include, but are not limited to, a thin-film battery having a porous separator, a spirally wound jelly-roll type battery, a prismatic battery, a coin-shaped battery, and the like.

A negative electrode of the lithium-sulfur battery according to the present invention includes at least one negative active material selected from the group consisting of lithium, sodium, lithium alloy, sodium alloy, and a lithium/ inactive sulfur compound. The negative electrode is spaced a predetermined distance apart from the positive electrode according to the present invention, and a separator is interposed between the positive and negative electrodes. The two electrodes are attached to a conductive substrate by any method, thereby inducing current to an external circuit through a current collector. Commonly, all components of the battery, including the positive electrode and the negative electrode, are sealed by means of an appropriate casing, such as plastic or a multi-layer aluminum pouch, with the conductive substrate protruding outward. In such a manner, reactive elements including sodium or lithium used as a negative active material and other battery components can be protected.

Any separator commonly used in lithium batteries may be used without limitations. Suitable examples of such a separator include a polyethylene separator, a polypropylene separator, a polyvinylidene fluoride separator, a vinylidene fluoride-hexafluoroprolylene (VDF-HFP) copolymer separator, a bilayer polyethylene/polypropylene separator, a triple layer polypropylene/polyethylene/polypropylene separator, a triple layer polyethylene/polypropylene/polyethylene separator, and the like.

The nonaqueous electrolyte used in the lithium-sulfur battery according to the present invention is not specifically limited as long as it can be used in the art, and a nonaqueous electrolyte having the same composition as that of the nonaqueous electrolyte impregnated into a polymer film of the positive electrode is preferably used.

A method for manufacturing a lithium-sulfur battery employing the positive electrode according to the present invention will now be described in detail.

First, the positive active material such as elemental sulfur, a conductive agent, a binder and a solvent were mixed to prepare a positive active material composition. Usable examples of the conductive agent and the binder are described above. Usable examples of such a solvent include, but are not limited to, acetonitrile, N-methyl-2-pyrrolidone (NMP), isopropyl alcohol, tetrahydrofuran, carbon disulfide, tetraglyme, dibutyl phthalate, acetone, and the like.

Then, the positive active material composition was directly coated on an aluminum substrate and dried to form a positive electrode having a positive active material layer. Otherwise, the positive active material composition may be cast on a separate support and peeled off to give a film, which is then laminated on the aluminum substrate, thereby fabricating a positive electrode. Here, suitable examples of such a support include a MYLAR film, polytetrafluoroethylene film, polyethylene film, polypropylene film, and the like.

Continuously, a composition comprising a monomer including 1 to 6 functional groups per molecule, selected from the group consisting of vinyl, allyl, acryl, methacryl and epoxy group, and the nonaqueous electrolyte, is coated on the positive active material layer. More preferably, the number of functional groups per molecule of the monomer is 2 to 6. Here, the composition is also impregnated into pores of the positive active material layer. Methods for coating the positive active material layer include deep coating, roller coating, spin coating, vacuum impregnating and the like. Usable examples of the monomer and the compositions of the nonaqueous electrolyte are described as above.

The coated positive electrode is subjected to heat press, UV ray, electron beam, X-ray or γ-ray treatment for polymerizing the monomer. Accordingly, a polymer film containing the nonaqueous electrolyte is coated on a surface of the positive active material layer, and pores in the positive active material layer are filled with a polymeric material containing the nonaqueous electrolyte. In case the monomer is polymerized by heat press, the heat-pressing temperature is preferably in the range of about 50 to about 90° C., and the heat-pressing time is preferably in the range of about 20 to about 80 seconds.

A lithium metal plate, a sodium metal plate, a lithium alloy plate, a sodium alloy plate or the like was cut into a predetermined size and used as the negative electrode. A conductive substrate made of a conductive metal plate, such as copper plate, may be stacked on the negative electrode.

Next, a separator is interposed between the positive electrode and the negative electrode, thereby forming an electrode unit. The electrode unit is wound or folded and put into a cylindrical or prismatic battery case, followed by injecting the nonaqueous electrolyte thereto and sealing the resulting structure, thereby completing the lithium-sulfur battery according to the present invention.

Hereinafter, the present invention will be explained in detail with reference to specific examples. These specific examples, however, should not in any sense be interpreted as limiting the scope of the present invention and equivalents thereof.

EXAMPLE 1

Manufacture of Lithium-Sulfur Battery 80 wt % of elemental sulfur, 5 wt % of a carbon black conductive material (Super-P), 15 wt % of a styrene butadiene rubber (SBR) (manufactured by Zeon Corp. in the name of BM4003B) having a weight-average molecular eight of 600,000 were dissolved in acetonitrile (20:1 in a weight ratio of solvent to solid content), followed by ball milling at 200 rpm for 6 hours, thereby preparing a homogenized positive active material slurry.

The positive active material slurry was coated on a carbon-coated Al substrate (Rexam) using a doctor blade to a thickness in which the loading density of the positive electrode becomes about 2 mAh/cm$^2$ assuming that discharge capacity of sulfur is 840 mAh/g, followed by drying at 80° C. for 24 hours.

30 g of TTEGDA monomer having a molecular weight of 300 was dissolved in 70 g of nonaqueous electrolyte to give a polymer film composition, and the polymer film composition was coated on a positive electrode by deep coating, followed by heating at 80° C. for about 30 seconds by heat press, thereby filling pores of the positive active material with a polymer of TTEGDA monomer and coating the surface of the positive active material layer with a polymer film made from the TTEGDA monomer. The polymer of the TTEGDA monomer has the nonaqueous electrolyte impregnated therein. The resultant product was rolled and cut into a predetermined size, thereby fabricating a positive electrode.

A 25 micron thick microporous PE/PP/PE separator (Asahi Co.) was used as a separator. The positive electrode and the separator were dried in vacuum for 24 hours to remove moisture before transferred to a glove box for final battery assembling work.

A 150 micron thick, high-purity metal lithium foil (FOOTE Mineral Co.) was used as a negative electrode. The lithium metal foil was stacked on the positive electrode with the separator interposed therebetween, and the resultant structure was assembled into a pouch-type battery cell. A nonaqueous electrolyte was injected into the pouch and sealed, thereby completing a lithium-sulfur battery. The nonaqueous electrolyte used to form the polymer film and the nonaqueous electrolyte inserted into the pouch are both obtained by uniformly dissolving 1M $LiN(SO_2CF_3)_2$ in a mixed solvent of diglyme (DGM)/dimethoxyethane(DME)/ dioxolane(DOX)(in a ratio of 4:4:2 by volume).

EXAMPLE 2

A lithium-sulfur battery was fabricated by the same procedure as in Example 1, except that PEGDMA having a molecular weight of 550 was used instead of the TTEGDA monomer having a molecular weight of 300.

EXAMPLE 3

A lithium-sulfur battery was fabricated by the same procedure as in Example 1, except that PEGDMA having a molecular weight of 875 was used instead of the TTEGDA monomer having a molecular weight of 300.

EXAMPLE 4

A lithium-sulfur battery was fabricated by the same procedure as in Example 1, except that PEGDMA having a molecular weight of 1,100 was used instead of the TTEGDA monomer having a molecular weight of 300.

EXAMPLE 5

A lithium-sulfur battery was fabricated by the same procedure as in Example 1, except that TMPTA having a molecular weight of 1,100 was used instead of the TTEGDA monomer having a molecular weight of 300.

COMPARATIVE EXAMPLE 1

A lithium-sulfur battery was fabricated by the same procedure as in Example 1, except that a polymer film was not formed on the positive active material layer and pores of the positive active material were not filled with a polymeric material.

Cycling Performance Test

Pouch-type lithium-sulfur battery cells fabricated in Examples 1 to 5 and Comparative Example 1 were tested for evaluation of cycle life characteristics in the following manner.

The lithium-sulfur battery cells were allowed to stand for 3 hours, followed by performing discharge and charge each once with the condition of 0.25 C in a voltage range between 2.8 and 1.5 V, and cycled at the condition of 0.5 C. During charging, a 150% cut-off condition of design capacity was further set.

FIG. 1 shows results of cycle life characteristics tested on pouch-type lithium-sulfur battery cells fabricated in Examples 1 to 5 and Comparative Example 1, in which line A indicates cycle life characteristics of a lithium-sulfur battery cell fabricated in Comparative Example 1 and lines B, C, D, E, and F indicate cycle life characteristics of lithium-sulfur battery cells fabricated in Examples 5, 1, 2, 3, and 4, respectively. Referring to FIG. 1, the lithium-sulfur battery cells fabricated in Examples 5 and 1 to 4 (lines B, and C to F) exhibited much better cycling performance than those fabricated in Comparative Examples 1 (line A). In particular, the lithium-sulfur battery cell fabricated in Example 3 (line E), in which PEGDMA having a molecular weight of 875 was used in forming a polymer film, showed the best cycling performance.

AC Impedance Test

Pouch-type lithium-sulfur battery cells fabricated in Examples 1 to 5 and Comparative Example 1 were tested for evaluation of AC impedance characteristics in the following manner.

The lithium-sulfur battery cells were allowed to stand for 3 hours, followed by performing discharge and charge each once with the condition of 0.25 C in a voltage range between 2.8 and 1.5 V, and cycled 20 times at 1 C. Then, the AC impedance was measured using 1260 FRA, an impedance measuring device manufactured by Solatron Co. A working electrode, a counter electrode and a reference electrode were all formed of lithium metal.

Figure 2:
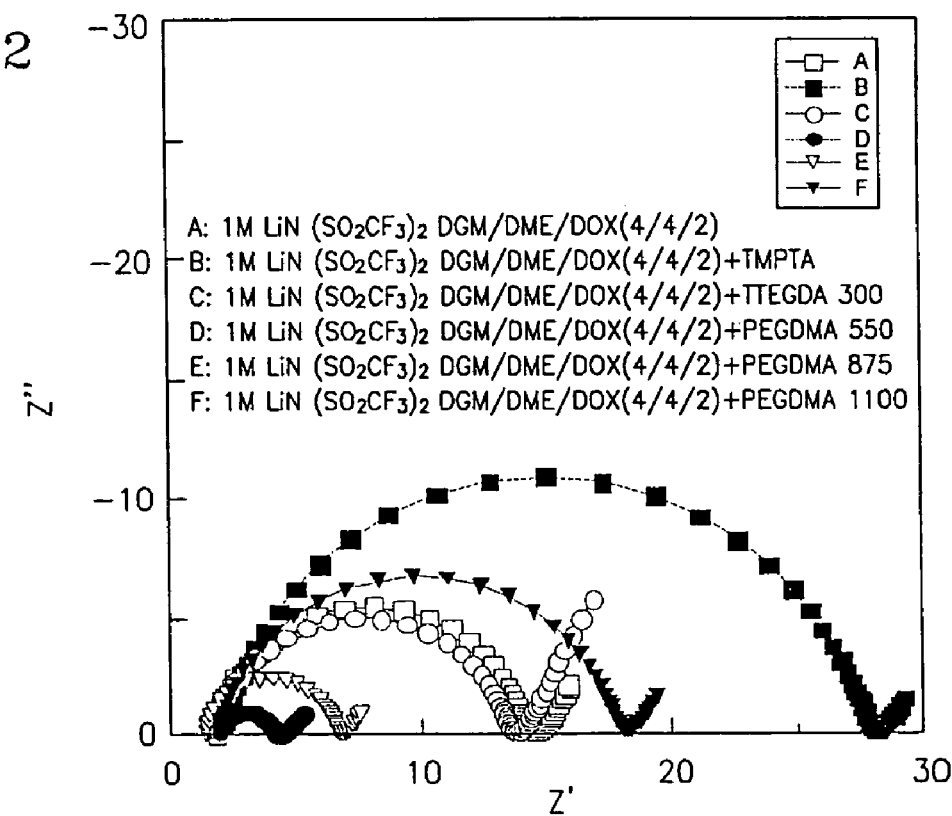
FIG. 2 is a graphical representation illustrating AC impedance characteristics of test cells according to Examples 1 through 5 of the present invention and Comparative Example 1.

FIG. 2 shows results of AC impedance tested on pouch-type lithium-sulfur battery cells fabricated in Examples 1 to 5 and Comparative Example 1, in which line A indicates impedance values of the lithium-sulfur battery cell fabricated in Comparative Example 1 and lines B, C, D, E, and F indicate impedance values of the lithium-sulfur battery cells fabricated in Examples 5, 1, 2, 3, and 4, respectively. Z' represents real parts of impedance values and Z" represents imaginary parts of impedance values. Referring to FIG. 2, the lithium-sulfur battery cells fabricated in Examples 2 and 3 (lines D and E), in which PEGDMA monomers having molecular weights of 550 and 875 were used in forming a polymer film, showed relatively low resistance.

Swelling Test

The positive electrodes prepared in Examples 1 to 5 and Comparative Example 1 were tested to evaluate swelling property. The swelling test was carried out by measuring a change in thickness of the positive electrodes after the positive electrodes were allowed to stand in an electrolytic solution at room temperature for 24 hours.

Figure 3:
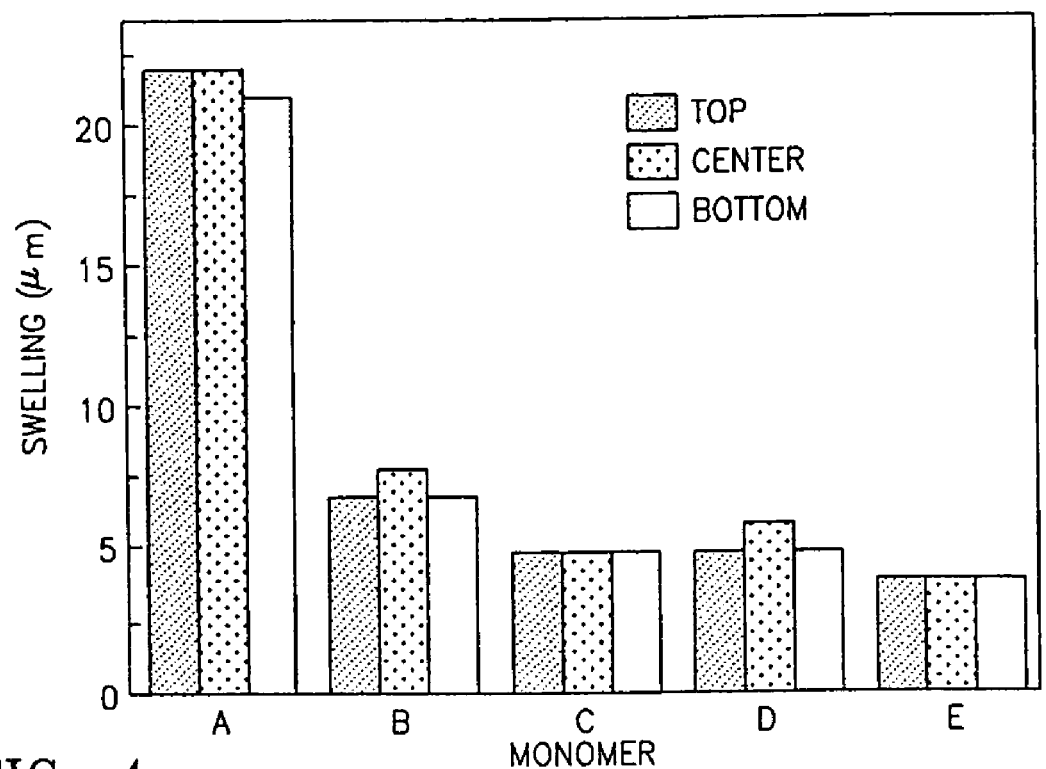
FIG. 3 illustrates average values of swelling levels measured three times at top, center and bottom portions of positive electrodes prepared in Examples 1 through 5 of the present invention and Comparative Example 1.

FIG. 3 illustrates average values of swelling levels measured three times at top, center and bottom portions of positive electrodes prepared in Examples 1–3 and 5 of the present invention and Comparative Example 1, in which bar A indicates the swelling level of an uncoated positive electrode prepared in Comparative Example 1 and bars B, C, D and E indicate swelling levels of coated positive electrodes prepared in Examples 5, and 1–3, respectively. Referring to FIG. 3, the coated positive electrodes(bars B–E) showed noticeably reduced swelling compared to the conventional uncoated positive electrode prepared in Comparative Example 1 (bar A).

Evaluation of Change in Discharge Capacity Depending on Amounts of the Monomers Charge and discharge tests were carried out on the lithium-sulfur battery fabricated in Example 1, in which the TTEGDA monomer having a molecular weight of 300 was used, in the following manner while varying the amounts of the TTEGDA monomer contained in the polymer film composition to 0 wt %, 10 wt %, 20 wt %, 30 wt % and 50 wt %.

Figure 4:
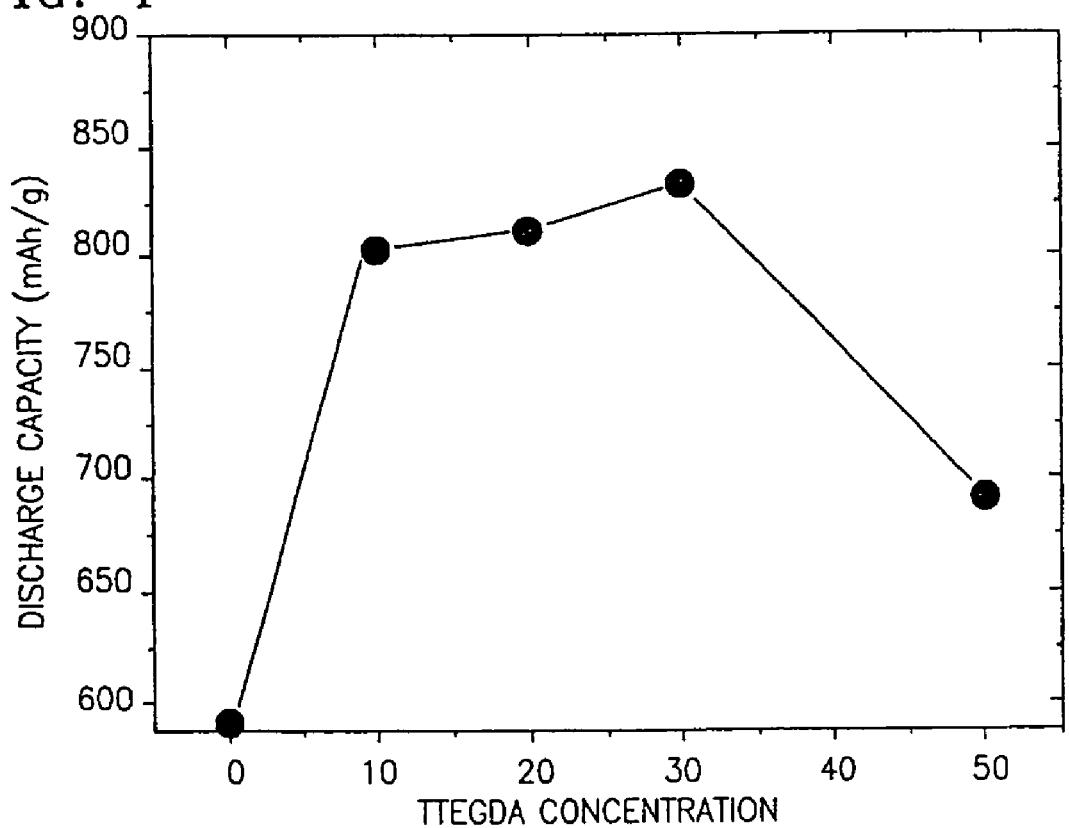
FIG. 4 shows discharge capacities of the lithium-sulfur battery fabricated in Example 1, measured after 20 charge and discharge cycles under the condition of 0.5 C.

FIG. 4 shows discharge capacities measured after 20 charge and discharge cycles under the condition of 0.5 C by the same method of the cycling test as described above.

Referring to FIG. 4, when the amount of the TTEGDA monomer was in a range of 10 wt % to 50 wt %, high discharge capacity was demonstrated. Particularly, when the amount of the TTEGDA monomer was 30 wt %, the highest discharge capacity was exhibited.

Figure 5:
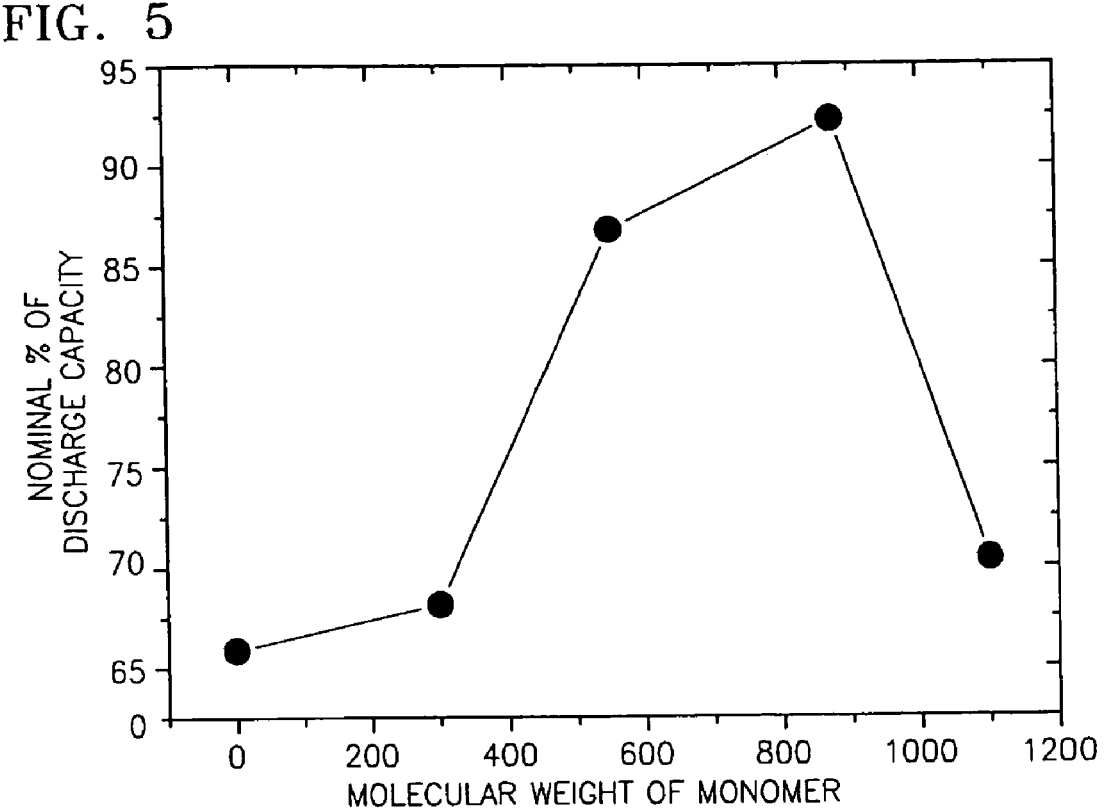
FIG. 5 shows discharge capacities of the lithium-sulfur batteries fabricated in Examples 1–4 and Comparative Example 1, measured after 20 cycles at the condition of 0.25 C charge/1.0 C discharge, the discharge capacities being expressed as percentages of discharge capacities after 1 cycle.

Evaluation of Change in Discharge Capacity Depending on Molecular Weights of the Monomers Charge and discharge tests were carried out on the lithium-sulfur battery cells fabricated in Examples 1 to 4 and Comparative Example 1. The lithium-sulfur battery cells were allowed to stand for 3 hours, followed by performing discharge and charge each once with the condition of 0.25 C in a voltage range between 2.8 and 1.5 V, and cycled 20 cycles at the condition of 0.25 C charge/1.0 C discharge. FIG. 5 shows discharge capacities measured after 20 cycles. The discharge capacities are expressed as percentages of discharge capacities after 1 cycle. Referring to FIG. 5, the lithium-sulfur battery cell fabricated in Example 3 in which the monomer having a molecular weight of 875 was used demonstrated the smallest change in discharge capacity.

Evaluation of Rate-Dependent Discharge Characteristic

Rate-dependent discharge characteristics were tested on the lithium-sulfur battery cells fabricated in Examples 1 to 5 and Comparative Example 1 in the following manner.

Figure 6:
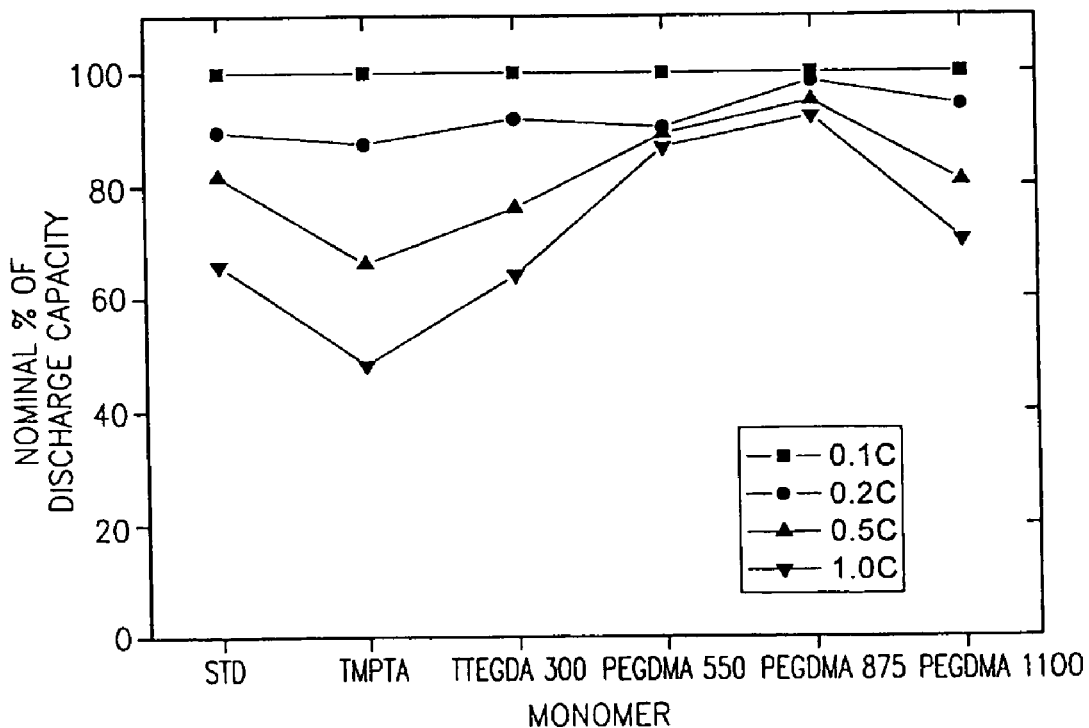
FIG. 6 shows discharge capacities of the lithium-sulfur batteries fabricated in Examples 1–5 and Comparative Example 1 after 1 cycle under the conditions of 0.25 C Charge/0.1 C discharge, 0.25 C charge/0.2 C discharge, 0.25 C charge/0.5 C discharge and 0.25 C charge/1.0 C discharge, respectively, the discharge capacities being expressed as percentages of discharge capacities measured under the condition of 0.25 C charge/0.1 C discharge.

The lithium-sulfur battery cells were allowed to stand for 3 hours, followed by discharge and charge each once with the condition of 0.25 C in a voltage range between 2.8 and 1.5 V, and cycled once under the conditions of 0.25 C charge/0.1 C discharge, 0.25 C charge/0.2 C discharge, 0.25 C charge/0.5 C discharge and 0.25 C charge/1.0 C discharge, respectively. Then, discharge capacities were measured at each rate after the 1 cycle. The evaluation results expressed as percentage of discharge capacities measured under the condition of 0.25 C charge/0.1 C discharge are shown in FIG. 6. Referring to FIG. 6, when the polymer film was formed of PEGDMA, the discharge capacities were high irrespective of rates.

Evaluation of Outer Appearance

The lithium-sulfur battery cells fabricated in Comparative Example 1 and Example 1 were charged and discharged 20 cycles under the condition of 0.5 C by the same method of the cycling test as described above, followed by disassembling the battery to observe the surface of a negative electrode formed of lithium metal.

Figure 7:
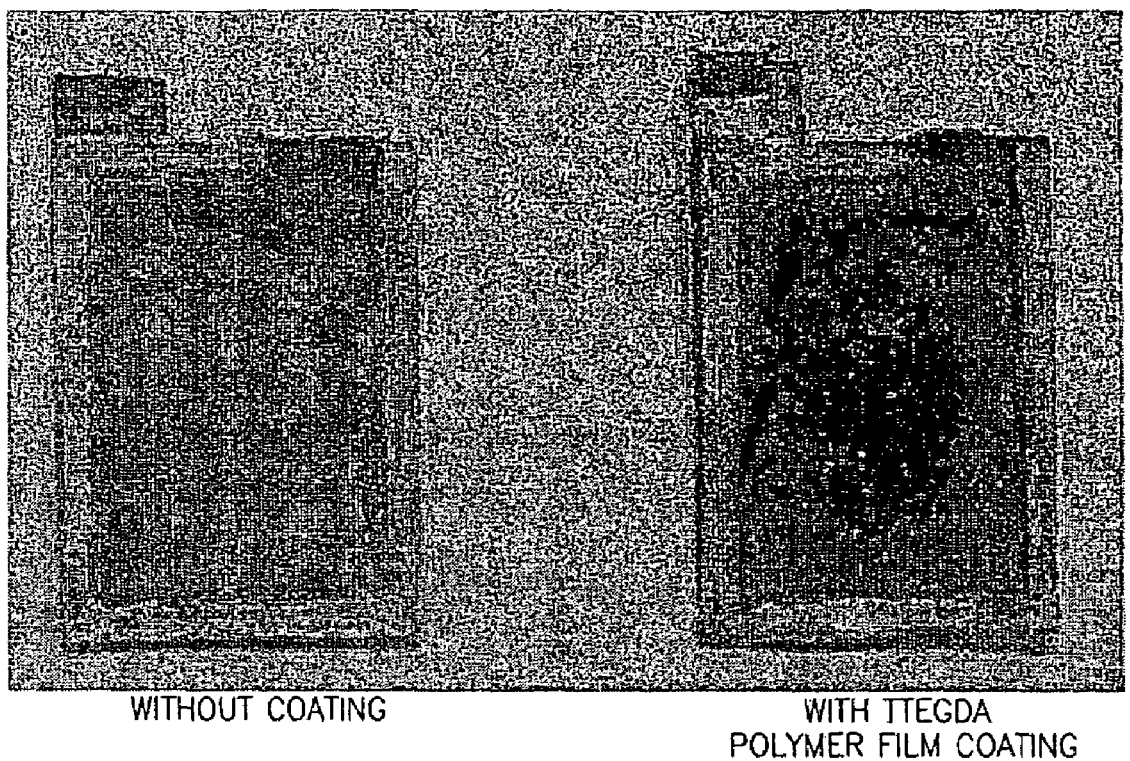
FIG. 7 shows a surface state of a negative electrode formed of lithium metal of the lithium-sulfur batteries fabricated in Example 1 and Comparative Example 1, observed after 20 charge and discharge cycles under the condition of 0.5 C.

FIG. 7 shows a surface state of the negative electrode formed of lithium metal observed after 20 charge and discharge cycles under the condition of 0.5 C.

Referring to FIG. 7, it is shown that the change of the negative electrode formed of lithium metal in the battery cell fabricated in Example 1 was less than that of the negative electrode in the battery cell fabricated in Comparative Example 1.

As described above, the positive electrode in the lithium-sulfur battery according to the present invention has improved electrolyte-impregnating capability. Also, a positive active material such as sulfur, lithium sulfide, or lithium polysulfide is suppressed from leaking into the electrolyte, so that the positive active material can further participate in the electrochemical reaction. Further, since the positive active material is prevented from reacting with lithium or lithium alloy, the negative electrode formed of lithium metal or lithium alloy can be stabilized.

Therefore, since the lithium-sulfur battery using the positive electrode according to the present invention increase degree of the positive active material utilization, the cycle characteristics and capability of the battery can be improved, and swelling of the positive electrode of the lithium-sulfur battery can be reduced.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A positive electrode, comprising:
   a positive active matenal layer comprising at least one positive active material selected from the group consisting of elemental sulfur, metal sulfide and metal polysulfide, the positive active material layer having pores filled with a polymeric material containing a nonaqueous electrolyte; and
   a polymer film coated on the positive active material layer, the polymer film formed of the polymeric material containing the nonaqueous electrolyte, the polymeric material formed by polymerization of a composition comprising 10 to 50 wt % of a monomer and 50 to 90 wt % of the nonaqucous electrolyte.

2. The positive electrode of claim 1, wherein the monomer includes 1 to 6 functional groups per molecule, and the functional groups are selected from the group consisting of a vinyl group, an allyl group, an acryl group, a methacryl group and an epoxy group.

3. The positive electrode of claim 2, wherein the monomer is at least one selected from the group consisting of acrylamide, divinylbenzene, butyl acrylate, hexyl acrylate, trimethylol propane triacrylate, butanediol diacrylate, butanediol dixnethacrylate, diallyl succinate, diailyl maleate, diallyl suberate, ethylene glycol diacrylate, ethylene glycol dimethacrylate, ethyleneglycol divinyl ether, tetra(ethylene glycol) diacrylate (TTEGDA), poly(ethylene glycol) diacrylate (PEGDA), poly(ethylene glycol) dimethacrylate (PEGDMA), and poly(ethylene glycol) divinyl ether.

4. The positive electrode of claim 2, wherein the monomer has a weight-average molecular weight of 200 to 2,000.

5. The positive electrode of claim 2, wherein the nonaqueous electrolyte comprises a nonaqueous solvent and 0.8 to 2.5 mol/l of a lithium salt.

6. The positive electrode of claim 5, wherein the lithium salt is at least one selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

7. The positive electrode of claim 5, wherein the nonaqueous solvent is at least one selected from the group consisting of benzene, flQorobenzene, toluene, trifluorotoluene, ,cylene, cyclohexane, tetrahydrofurane (THF), 2-methyltetrahydrofurafle, ethanol, isopropyl alcohol, dimethylcarbonate, ethyl methyl carbonate, dietbyl carbonate, methyl propyl carbonate, methyl propionate, ethyl propionate, methyl acetate, ethyl acetate, propyl acetate, 1,3-dioxolane, glyme, diglyme, tetraglyme, ethylene carbonate, propylene carbonate, gamma butyrolactane(GBL), sulfolane, dimethylsulfone, butyrolactone, N-methyl pyrrolidone, tetramethylurea, $C_2$ to $C_{12}$ alipbatic ether, at least one crown ether selected from the group consisting of 12-crown-4, 15-crown-5, 18-crown-6 and dibenzo-18-crown-6, dimethoxyethane, hexamethyiphosphoanilde, pyridine, N,N-dimethylformamide, N,N-diethylformamide, N,N-dimethylacetamide, N,N-diethylacetamide, dimethylsulfoxide, tetramethylurea, trimethyl phosphate, tributyl phosphate, tetrainethylethylenediamine, tetramethylpropylenediamine, and pentamethyldiethylenetriamine.

8. The positive electrode of claim 1, wherein the positive active material layer further includes at least one conductive agent selected from the group consisting of carbon black, graphite, carbon fiber, a conductive compound having a conjugated carbon-carbon double bond, and a conductive compound having a conjugated carbon-nitrogen double bond.

9. The positive electrode of claim 1, wherein the polymer film has a thickness of 0.5 to 10 µm.

10. A lithium-sulfur battery comprising:
a nonaqileous electrolyte;
a negative electrode comprising at least one negative active material selected from the group consisting of lithium, sodium, lithium alloy, sodium alloy, and a composite of lithium/inactive sulfur conipound;
a positive electrode comprising:
a positive active material layer comprising at least one positive active material selected from the group consisting of elemental sulfur, metal sulfide and metal polysulfide, wherein pores of the positive active material layer are filled with a polymeric material containing a nonaqueous electrolyte; and
a polymer film coated on the positive active material layer, the polymer film formed of the polymeric material containing the nonaqueous electrolyte, the polymeric material formed by polymerization of a composition comprising 10 to 50 wt % of a monomer and 50 to 90 wt % of the nonaqueous electrolyte; and
a separator disposed between the negative electrode and the positive electrode for separating the negative electrode and the positive electrode from each other.

11. The lithium-sulfur battery of claim 10, wherein the monomer includes 1 to 6 functional groups per molecule, and the functional groups are selected from the group consisting of a vinyl group, an ailyl group, an acryl group, a methacryl group and an epoxy group.

12. The lithium-sulfur battery of claim 11, wherein the monomer is at least one selected from the group consisting of acrylamide, divinylbeuzene, butyl acrylate, hexyl acrylate, trimethylol propane triacrylate (TMPTA), butanediol diacrylate, butanediol dimethacrylate, diallyl succinate, diallyl maleate, diallyl suberate, ethylene glycol diacrylate, ethylene glycol dimethacrylate, ethyleneglycol divinyl ether, tetra(ethylene glycol) diacrylate (TTEODA), poly(ethylene glycol) diaciylate (PEGDA), poly(ethylene glycol) dimethacrylate (PEGDMA), and poly(ethylene glycol) divinyl ether.

13. The lithium-sulfur battery of claim 11, wherein the monomer has a weight-average molecular weight of 200 to 2,000.

14. The lithium-sulfur battery of claim 10, wherein the positive active material layer further includes at least one conductive agent selected from the group consisting of carbon black, graphite, carbon fiber, a conductive compound having a conjugated carbon-carbon double bond, and a conductive compound having a conjugated carbon-nitrogen double bond.

15. The lithium-sulfur battery of claim 10, wherein the polymer film has a thickness of 0.5 to 10 µm.

16. A lithium-sulfur battery comprising:
a first nonaqueous electrolyte;
a negative electrode comprising a negative active material;
a positive electrode comprising:
a positive active material layer comprising at least one positive active material and optionally at least one conductive agent selected from the group consisting of carbon black, graphite, carbon fiber, a conductive compound having a conjugated carbon-carbon double bond and a conductive compound having a conjugated carbon-nitrogen double bond, the positive active material layer having pores tilled with a polymeric material impregnated with a second nonaqueous electrolyte; and
a polymer film coated on the positive active material layer, the polymer film formed of the polymeric material impregnated with the second nonaqueous electrolyte, the polymeric material formed by polymerization of a composition comprising 10 to 50 wt % of a monomer and 50 to 90 wt % of the second nonaqueous electrolyte, the monomer having a weight-average molecular weight of 200 to 2,000; and
a separator disposed between the negative electrode and the positive electrode for separating the negative electrode and the positive electrode from each other.

17. The lithium-sulfur battery of claim 16, wherein the first nonaqueous electrolyte and the second nonaqueous electrolyte are the same.

18. The lithium-sulfur battery of claim 16, wherein the monomer includes 1 to 6 functional groups per molecule, and the functional groups are selected from the group consisting of a vinyl group, an allyl group, an acryl group, a methacryl group and an epoxy group.

* * * * *